United States Patent

[11] 3,594,658

[72] Inventors Charles M. Cason, III
7114 Criner Road, S.E., Huntsville, Ala. 35802;
James F. Perkins, 1808 Melbourne Ave., N.E., Huntsville, Ala. 35801; Thomas A. Barr, Jr., 7803 Martha Drive, S.E., Huntsville, Ala. 35802
[21] Appl. No. 690,045
[22] Filed Nov. 27, 1967
[45] Patented July 20, 1971

[54] HIGH-PRESSURE LASER HAVING THERMAL-PUMPING MEANS
9 Claims, 2 Drawing Figs.
[52] U.S. Cl. ........................................ 331/94.5
[51] Int. Cl. ........................................ H01s 3/09
[50] Field of Search ............................. 331/94.5

[56] References Cited
UNITED STATES PATENTS
3,302,127   1/1967   Shao-Chi Lin................ 331/94.5

OTHER REFERENCES
Patel (I), C. K. N., " Selective Excitation Through Vibrational Energy Transfer and Optical Laser Action In $N_2$-$CO_2$," Physical Review Letters, Vol. 13, pp. 617— 619, Nov. 23, 1964.
Patel (II), C. K. N., "C W High Power in $N_2$-$CO_2$ Laser," Applied Physics Letters, Vol. 7, pp. 15— 17, July 1, 1965.

Primary Examiner—Ronald L. Wibert
Assistant Examiner—Edward S. Bauer
Attorneys—Harry M. Saragovitz, Edward J. Kelly, Herbert Berl and Harold W. Hilton ABSTRACT: Apparatus, including an optical cavity, in which a thermally heated gas is mixed with a relatively cold gas of different chemical or isotopic composition. The cold gas is disposed for excitation (pumping) by the hotter gas for providing lasing action. In the present invention the gases are mixed at their respective equilibrium temperatures, in a ratio which will provide the necessary population inversion to produce coherent energy. The apparatus includes a housing having first and second sections. The pumping gas is admitted and heated in the first section and the second or lasing gas is mixed with the heated gas in a mixing chamber and expanded into a lasing chamber in a second section of the housing. Optical feedback means, such as a pair of mirrors are disposed at opposite ends of the second housing section. One of the mirrors covers the entire cross section of the housing to reflect coherent energy to the second mirror which may be partially transmitting or provided with a slit therein to direct the coherent energy from the housing.

The interaction of the gases in the mixing and lasing chambers results in an inversion of population of energy levels in the gases to provide optical gain at a frequency or frequencies corresponding to differences in energies of levels which are totally or partially inverted.

The invention described herein may be manufactured, used, and licensed by or for the Government for governmental purposes without the payment to us of any royalty thereon.

3,594,658

PATENTED JUL 20 1971

Charles M. Cason, III
James F. Perkins
Thomas A. Barr, Jr.,
INVENTORS.

BY *Harry M. Saragovitz*
*Edward J. Kelly*
*Herbert Berl*
*Harold W. Hilton*

HIGH-PRESSURE LASER HAVING THERMAL-PUMPING MEANS

BACKGROUND OF THE INVENTION

Lasing action requires (1) a total or partial population inversion giving rise to optical gain and (2) an optical feedback which converts the optical "amplifier" into an "oscillator." Population inversion has usually been obtained by supplying "pumping" energy to a homogeneous laser material in such a manner that the population of the various microscopic energy states depart suitably from that of a Boltzmann distribution. Pumping energy has usually been obtained from a source of electrical power, as by exciting an electric discharge in the (gaseous) laser material or by first converting the electrical power into relatively broadband light energy which is then impinged on the laser material. The optical gain per unit path length has usually been quite small; thus, a high degree of perfection has been required of the mirrors which serve as feedback devices.

The thermally pumped laser of the present invention obtains its population inversion as a result of combining two gases at thermal equilibrium temperatures; it is not required that either gas have a population inversion prior to mixing. The nonequilibrium state required for population inversion results from the mixing. The mixing occurs at sufficiently high temperatures to excite a substantial quantity of atoms or molecule of the lasing gas to sufficiently high excited states. This is possible because of the relatively low energy of the laser levels which are to be excited.

Particular advantages of this laser are simplicity and economy of providing pumping energy and the overall simplicity and ruggedness of the device. Recent experiments have shown the optical gain of some some gaseous lasers to be so high that crude mirroring provides adequate optical feedback. This is in contrast to the very critical requirements on mirrors in other types of lasers. Power output is high. Efficiency is moderately high, though this is not a necessary attribute considering the simplicity, cheapness, and ready availability in a great variety of environments of chemical fuels as sources of energy.

SUMMARY OF THE INVENTION

The present invention provides a laser in which "pumping" is obtained by mixing gases at their respective thermal equilibrium temperatures. The thermally pumped laser provides an inexpensive source of intense, highly monochromatic, relatively coherent radiation. Additionally, the principles of the present invention include the production of gases by chemical reactions to produce a population inversion responsive to mixing thereof.

It is, therefore, an object of the present invention to provide a laser in which population inversion is accomplished by combining two gases of different temperatures.

It is another object of the present invention to provide mechanism for mixing, in an optical cavity, a thermally heated pumping gas with a relatively cold lasing gas, said gases being disposed for mixing at equilibrium temperature.

It is yet another object of the present invention to provide mechanism in which the gases are produced in a combustion chamber in thermal equilibrium and then expanded into the optical cavity.

It is another object of the present invention to provide such a laser in which the pump gas is heated by chemical combustion of the lasing gas.

It is still another object of the present invention to provide such a laser in which the optical gain is so high that crude mirroring provides adequate feedback.

Other objects of the present invention will become more readily apparent from the following detailed description of the drawing in which:

DESCRIPTION OF THE PREFERRED EMBODIMENT

Figure 1:
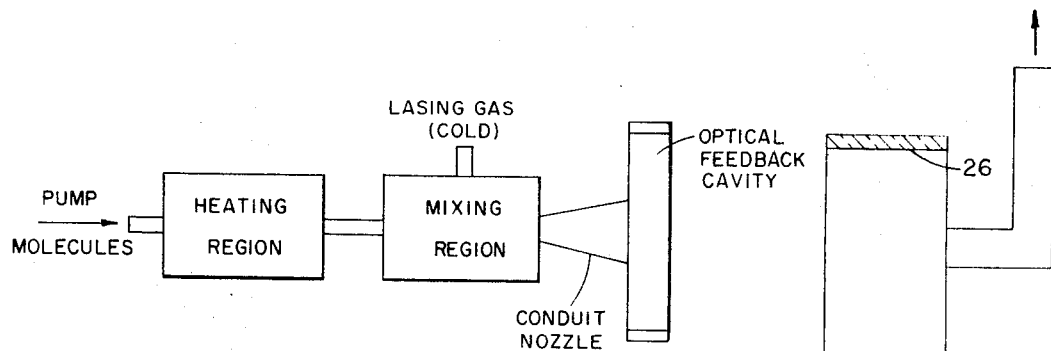
FIG. 1 is a diagrammatic view illustrating the principles of the invention.

As shown in the figures, the laser 10, generally includes a housing 12 having a pair of sections 14 and 16. Section 14 includes a pair of chambers 18 and 20 disposed for receiving the gases therein heating and mixing thereof, and a conduit 22 which may be a nozzle, for directing the mixed gases to a lasing chamber 24 of section 16 of the housing. A pair of mirrors 26 and 28 are mounted at the ends of chamber 24 to provide an optical feedback cavity. One of the mirrors covers the entire cross section of the chamber and the other window is partially transmitting or provided with a slit 30 for emitting the laser radiation. The mixing occurs at relatively high pressures in a field-free region.

In one example of the present invention, nitrogen is the gas used and it is thermally heated in chamber 18 of section 14 at equilibrium temperature. The nitrogen is then passed to chamber 20 where it is mixed with cold carbon dioxide and quenching gases. Equilibrium heating at substantially high pressure (on the order of 1 atmosphere) will generate a population inversion in the optical feedback cavity and pass some light outside. Under equilibrium conditions a certain fraction of nitrogen will be in the V=1 vibrational level which is in collision resonance with the 00°1 level carbon dioxide.

At approximately 1,000° K, when the gas is in thermal equilibrium, 16 percent of the nitrogen will be at this required level. The maximum percentage of nitrogen molecules which may be in this level at thermodynamic equilibrium is about 20 percent at 2,300° K. When the nitrogen equilibrium temperature is above 1.7 times the equilibrium $CO_2$ temperature, the threshold temperature ratio, lasing action conditions are satisfied. That is, by exciting the vibrational and rotational levels of a pair of gases to their respective percentages of population, lasing action conditions are satisfied. That is, the upper levels are populated. The minimum estimate of this percentage-excited population arises from a thermal equilibrium calculation. The example set forth above is illustrative of typical excitation levels in nitrogen and $CO_2$, when these two gases are utilized for producing lasing action.

Figure 2:
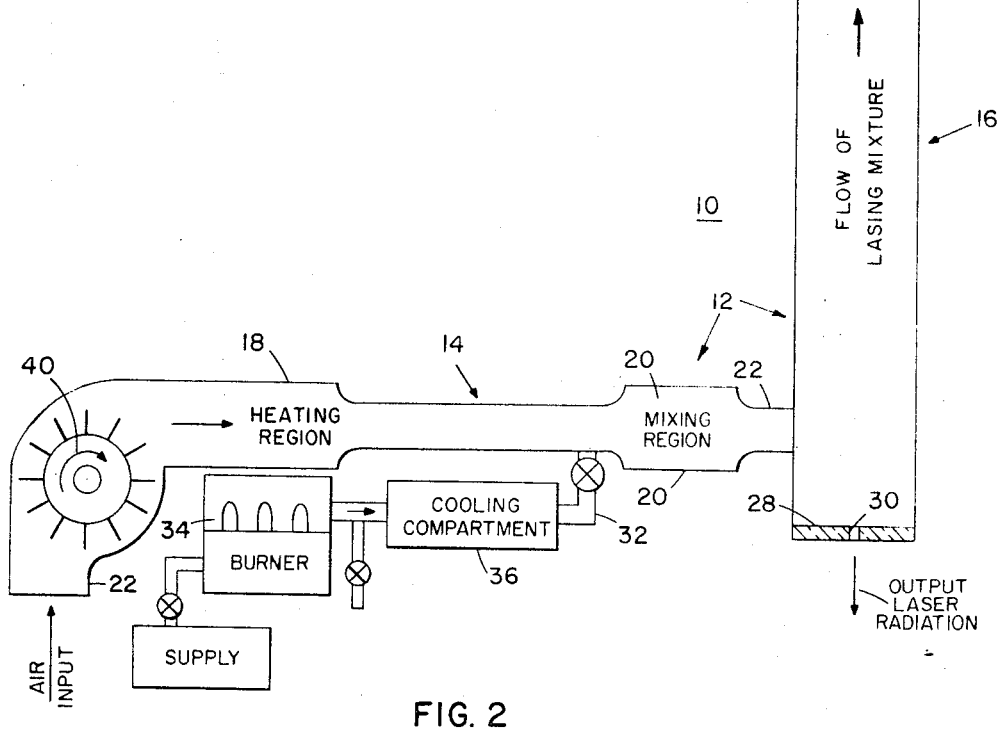
FIG. 2 is a diagrammatic view illustrating one embodiment of the invention.

Another approach at providing a source for the nitrogen and $CO_2$ is illustrated in FIG. 2 wherein like reference numerals refer to like parts. In this embodiment, the laser 10 is shown to include a housing 12 having a pair of sections 14 and 16. Section 14 includes a pair of chambers 18 and 20 and a first inlet 22 connected to a source of air and to chamber 18 which is a heating region. A second inlet 32 is connected downstream of heating chamber 18 and is disposed in communication with a combustion chamber 34 which connects to a supply of nitrogen. The second chamber 20 of section 14 defines a mixing region which communicates with combustion chamber 34, heating region 18, and the second housing section 16. The example cited above calculating the percentage of excited molecules, used the well-known Boltzman relationship. The Boltzman relationship is well known in the art and is described by G. Herzberg in Vol. I of "Molecular Spectra and Molecular Structure I; Diatomic Molecules," Prentiss-Hall, New York, 1930, and Vol. II, "Molecular Spectra and Molecular Structure II; Infra Red and Raman Spectra of Polyatomic Molecules," D. Van Nostrand Co., Princeton, N.J., 1964. This Boltzman relationship predicts population of molecules within all levels within a particular mode of vibronic excitation for a given equilibrium temperature. It is used here when all molecules in all levels for a particular vibronic mode are in equilibrium with each other. They are not required to be in equilibrium with anything else. Each mode of vibration has its own respective equilibrium temperature. Thermal equilibrium is the condition when all vibrational equilibrium temperatures for all modes of all molecules are identical.

Section 16 includes an exhaust 32, mirror 26 mounted across the entire cross section of the housing and mirror 28 which is partially transmitting or provided with a slit 30 is mounted at the opposite end of the housing section 16.

In operation, input of air is maintained by a pump 40, using electrical, chemical, manual, or other power. Within heating region 18, the air receives heat supplied by a flame in combustion chamber 34, but the heated air is not allowed to mix with combustion products in this region. The flame may be produced by combustion of a wide variety of fuels, for example kerosene. A suitable fraction of relatively cool combustion products are drawn off and allowed to mix in mixing region 20 with the higher temperature air from the heating region. If desired, the combustion products may be reduced to near-ambient temperature in a cooling compartment 36 or an external gas supply may be used. This mixture then flows into section 16 and through a lasing region 24 and is exhausted into the atmosphere through exhaust 32. Interaction of the heated air and combustion products in both the mixing region and lasing region results in an inversion of population of energy levels in the combustion products. This results in optical gain at a frequency or frequencies corresponding to difference in energy levels of the combustion products which are inverted. The required optical feedback is supplied by the back mirror 26 and front mirror 28. The back mirror 26 covers the cross section of the lasing region. The front mirror 28 covers only a portion of the cross section, the uncovered portion providing a means of exit of the laser radiation. Alternatively the front mirror may be partially transmitting and cover the entire cross section. The rather high optical gain results in a relatively noncritical requirement for optical perfection and alignment of the mirrors.

It will be noted that the population inversions of significance are those of the $CO_2$ component of the combustion products, resulting from interaction with excited states of nitrogen in the input air. However, it is not essential to select this particular mode of operation, and the present invention is not so limited. It is not essential for many applications that any restrictions be imposed on choice of fuels, etc., so as to select the nitrogen-carbon dioxide mode of inversion. Lasing action resulting from other modes of inversion will increase the total output laser radiation. In many applications the principal parameter of interest is total output radiation rather than spectral purity or degree of coherence.

If desired, the nitrogen could be heated by collisions in electric arc units. Cold $CO_2$ is then injected in the nitrogen in mixing chamber 20 and expanded through nozzle 22 into section 16 to enter the optically active region, or; nitrogen and $CO_2$ could be produced in a combustion chamber as products of combustion in thermal equilibrium and then expanded into the optical cavity.

Sodium or lithium azide may be resorted to as a source of the nitrogen. Sodium or lithium azide is an unstable compound but decomposes to give hot nitrogen at 1,200° K. Cold $CO_2$ is then injected in the nitrogen in the mixing chamber and the mixture expanded into the optical cavity.

While the above discussion has been directed to nitrogen and carbon dioxide, it is not intended that the invention would be so limited. Quite obviously, many other gases may be resorted to that is within the inventive concept of the present invention. For example, argon could be utilized and heated by electric arc and mixed with carbon monoxide. The mixture would then be expanded through a two-dimensional nozzle into the optically active region.

We claim:

1. A continuous flow gaseous laser comprising apparatus for receiving first and second gases therein for mixing in a field-free mixing region at their respective thermal equilibrium temperatures in a ratio to provide population inversion of said second gas for producing substantially coherent energy, said first gas being a pumping gas disposed for excitation of said second gas for energy exchange therebetween for the population inversion of said second gas, said apparatus including: means for exciting said gases to said thermal equilibrium temperatures thereby populating the upper energy levels of said gases; a housing having a first section provided with said field-free mixing region therein for receiving said excited gases for mixing thereof, and a second section disposed in communication with said first section to receive said mixed gases therefrom, said second section further including optical feedback means disposed for emitting said coherent energy from said second section responsive to said population inversion; and, source means including a fuel disposed for chemical combustion for producing said second gas, and a source for providing said first gas, said first gas disposed for heating by the combustion of said fuel for providing the thermal equilibrium temperatures to said first and second gases.

2. Apparatus as in claim 1 wherein said first gas is nitrogen.

3. Apparatus as in claim 2 wherein said second gas is carbon dioxide.

4. Apparatus as in claim 3 including means for heating said nitrogen, injection means for injecting said carbon dioxide into said mixing region; and, nozzle means communicating between said first and second sections of said housing, said nozzle means disposed for expanding the mixed gases into said second housing section.

5. A continuous flow gaseous laser comprising apparatus for receiving nitrogen pumping gas and carbon dioxide lasing gas therein for mixing in a field-free mixing region at their respective thermal equilibrium temperatures in a ratio to provide a population inversion in said lasing gas for producing substantially coherent energy, said apparatus including: means for exciting said nitrogen and carbon dioxide to said thermal equilibrium temperatures; a housing provided with a first section for receiving said gases, said first section being said field-free mixing region for pumping of said lasing gas, and, a second section disposed in communication with said first section to receive said gases therefrom, said second section further including optical feedback means disposed for emitting said coherent energy from said second section responsive to said population inversion; and, source means for supplying said gases, said source means including a fuel disposed for chemical combustion for producing said carbon dioxide, and a source of air for providing said nitrogen, said air disposed for heating by the combustion of said fuel for providing the respective thermal equilibrium temperatures in said gases.

6. Apparatus as in claim 5 wherein said housing includes a heating chamber for heating said air, said heating chamber communicating with said mixing region for passage of heated air thereto, and, a combustion chamber for the combustion of said fuel, said combustion chamber communicating with said mixing region for passage of said carbon dioxide thereto responsive to the chemical combustion, said gases disposed for passage into said second section of said housing responsive to mixing in said mixing chamber; and exhaust means disposed in said second section of said housing.

7. Apparatus as in claim 6 wherein said optical feedback means includes a first mirror mounted at one end of said second section of said housing and covering the entire cross section thereof; and, a second mirror mounted at the opposite end of said second section of said housing for transmitting said coherent energy therethrough.

8. Apparatus as in claim 7 wherein said second window is provided with a slit for transmitting said coherent energy therethrough.

9. A continuous flow gaseous laser comprising apparatus for receiving nitrogen pumping gas and carbon dioxide lasing gas therein for mixing in a field-free mixing region at their respective thermal equilibrium temperatures in a ratio to provide a population inversion in said lasing gas for producing substantially coherent energy, said apparatus including: means for exciting said nitrogen and carbon dioxide to said thermal equilibrium temperatures; a housing provided with a first section for receiving said gases, said first section being said field-free mixing region for pumping of said lasing gas, and, a second section disposed in communication with said first section to receive said mixed gases therefrom, said second section further including optical feedback means disposed for emitting said coherent energy from said second section responsive to said population inversion; and source means for supplying said gases, said source means including a gas generator for decomposing sodium azide for producing said nitrogen; and injector means for injecting carbon dioxide into said mixing region for mixing with said nitrogen.